US008019866B2

(12) United States Patent
Tonnesen

(10) Patent No.: US 8,019,866 B2
(45) Date of Patent: *Sep. 13, 2011

(54) SYSTEM AND METHOD FOR DETECTION OF ABERRANT NETWORK BEHAVIOR BY CLIENTS OF A NETWORK ACCESS GATEWAY

(75) Inventor: Steven D. Tonnesen, Cedar Park, TX (US)

(73) Assignee: Rocksteady Technologies, LLC, Austin, TX (US)

( * ) Notice: Subject to any disclaimer, the term of this patent is extended or adjusted under 35 U.S.C. 154(b) by 64 days.

This patent is subject to a terminal disclaimer.

(21) Appl. No.: 12/536,700

(22) Filed: Aug. 6, 2009

(65) Prior Publication Data

US 2009/0300177 A1      Dec. 3, 2009

Related U.S. Application Data

(63) Continuation of application No. 11/076,652, filed on Mar. 10, 2005, now Pat. No. 7,590,728.

(60) Provisional application No. 60/551,697, filed on Mar. 10, 2004.

(51) Int. Cl.
  *G06F 15/173* (2006.01)
(52) U.S. Cl. ............... 709/224; 709/223; 709/225
(58) Field of Classification Search ........... 709/224
  See application file for complete search history.

(56) References Cited

U.S. PATENT DOCUMENTS

| | | | |
|---|---|---|---|
| 5,673,393 A | 9/1997 | Marshall et al. | |
| 5,706,427 A | 1/1998 | Tabuki | |
| 5,748,901 A | 5/1998 | Afek et al. | |
| 5,878,231 A | 3/1999 | Baehr et al. | |
| 5,896,499 A | 4/1999 | McKelvey | |
| 5,901,148 A | 5/1999 | Bowen et al. | |
| 5,936,542 A | 8/1999 | Kleinrock et al. | |
| 5,953,506 A | 9/1999 | Kalra et al. | |

(Continued)

FOREIGN PATENT DOCUMENTS

EP      0587522 A2      1/2000

(Continued)

OTHER PUBLICATIONS

Office Action issued in U.S. Appl. No. 11/076,672, mailed Jan. 7, 2010, 9 pgs.

(Continued)

*Primary Examiner* — Kevin Bates
*Assistant Examiner* — Joe Chacko
(74) *Attorney, Agent, or Firm* — Sprinkle IP Law Group

(57) ABSTRACT

A system and method for detecting aberrant network behavior. One embodiment provides a system of detecting aberrant network behavior behind a network access gateway comprising a processor, a first network interface coupled to the processor, a second network interface coupled to the processor, a storage media accessible by the processor and a set of computer instructions executable by the processor. The computer instructions can be executable to observe network communications arriving at the first network interface from multiple clients and determine when the traffic of a particular client is indicative of malware infection or other hostile network activity. If the suspicious network communication is determined to be of a sufficient volume, type, or duration the computer instructions can be executable to log such activity to storage media, or to notify an administrative entity via either the first network interface or second network interface, or to make the computer instructions be executable to perform other configured actions related to the functioning of the network access gateway.

19 Claims, 6 Drawing Sheets

U.S. PATENT DOCUMENTS

| | | |
|---|---|---|
| 5,987,134 A | 11/1999 | Shin et al. |
| 5,996,013 A | 11/1999 | Delp et al. |
| 6,085,241 A | 7/2000 | Otis |
| 6,088,451 A | 7/2000 | He et al. |
| 6,092,200 A | 7/2000 | Muniyappa et al. |
| 6,108,782 A | 8/2000 | Fletcher et al. |
| 6,130,892 A | 10/2000 | Short et al. |
| 6,131,116 A | 10/2000 | Riggins et al. |
| 6,157,953 A | 12/2000 | Chang et al. |
| 6,173,331 B1 | 1/2001 | Shimonishi |
| 6,176,883 B1 | 1/2001 | Holloway et al. |
| 6,185,567 B1 | 2/2001 | Ratnaraj et al. |
| 6,194,992 B1 | 2/2001 | Short et al. |
| 6,199,113 B1 | 3/2001 | Alegre et al. |
| 6,205,552 B1 | 3/2001 | Fudge |
| 6,212,558 B1 | 4/2001 | Antur et al. |
| 6,219,706 B1 | 4/2001 | Fan et al. |
| 6,233,607 B1 | 5/2001 | Taylor et al. |
| 6,243,815 B1 | 6/2001 | Antur et al. |
| 6,275,693 B1 | 8/2001 | Lin et al. |
| 6,295,294 B1 | 9/2001 | Odlyzko |
| 6,321,339 B1 | 11/2001 | French et al. |
| 6,324,648 B1 | 11/2001 | Grantges, Jr. |
| 6,336,133 B1 | 1/2002 | Morris et al. |
| 6,404,743 B1 | 6/2002 | Meandzija |
| 6,421,319 B1 | 7/2002 | Iwasaki |
| 6,463,474 B1 | 10/2002 | Fuh et al. |
| 6,473,793 B1 | 10/2002 | Dillon et al. |
| 6,473,801 B1 | 10/2002 | Basel |
| 6,477,143 B1 | 11/2002 | Ginossar |
| 6,502,131 B1 | 12/2002 | Vaid et al. |
| 6,516,417 B1 | 2/2003 | Pegrum et al. |
| 6,535,879 B1 | 3/2003 | Behera |
| 6,539,431 B1 | 3/2003 | Sitaraman et al. |
| 6,636,894 B1 | 10/2003 | Short et al. |
| 6,678,733 B1 | 1/2004 | Brown et al. |
| 6,708,212 B2 * | 3/2004 | Porras et al. .................. 709/224 |
| 6,732,179 B1 | 5/2004 | Brown et al. |
| 6,735,691 B1 | 5/2004 | Capps et al. |
| 6,757,740 B1 | 6/2004 | Parekh et al. |
| 6,785,252 B1 | 8/2004 | Zimmerman et al. |
| 6,789,110 B1 | 9/2004 | Short et al. |
| 6,804,783 B1 | 10/2004 | Wesinger et al. |
| 6,823,385 B2 | 11/2004 | McKinnon et al. |
| 6,917,622 B2 | 7/2005 | McKinnon et al. |
| 7,013,331 B2 | 3/2006 | Das |
| 7,120,934 B2 | 10/2006 | Ishikawa |
| 7,143,283 B1 | 11/2006 | Chen et al. |
| 7,146,639 B2 | 12/2006 | Bartal et al. |
| 7,181,017 B1 | 2/2007 | Nagel et al. |
| 7,185,368 B2 | 2/2007 | Copeland, III |
| 7,266,754 B2 | 9/2007 | Shah |
| 7,272,646 B2 * | 9/2007 | Cooper et al. ................. 709/223 |
| 7,324,947 B2 | 1/2008 | Jordan et al. |
| 7,325,042 B1 | 1/2008 | Soscia et al. |
| 7,406,530 B2 | 7/2008 | Brown et al. |
| 7,420,956 B2 | 9/2008 | Karaoguz et al. |
| 7,454,792 B2 | 11/2008 | Cantrell et al. |
| 7,509,625 B2 | 3/2009 | Johnston et al. |
| 7,587,512 B2 | 9/2009 | Ta et al. |
| 7,590,728 B2 | 9/2009 | Tonnesen et al. |
| 7,610,621 B2 | 10/2009 | Turley et al. |
| 7,624,438 B2 | 11/2009 | White |
| 2001/0038639 A1 | 11/2001 | McKinnon et al. |
| 2001/0038640 A1 | 11/2001 | McKinnon et al. |
| 2001/0038645 A1 | 11/2001 | McKinnin et al. |
| 2001/0039576 A1 | 11/2001 | Kanada |
| 2001/0039582 A1 | 11/2001 | McKinnon et al. |
| 2002/0013844 A1 | 1/2002 | Garrett et al. |
| 2002/0021665 A1 | 2/2002 | Bhagavath et al. |
| 2002/0023160 A1 | 2/2002 | Garrett et al. |
| 2002/0029260 A1 | 3/2002 | Dobbins et al. |
| 2002/0035699 A1 | 3/2002 | Crosbie |
| 2002/0042883 A1 | 4/2002 | Roux et al. |
| 2002/0046264 A1 | 4/2002 | Dillon et al. |
| 2002/0052950 A1 | 5/2002 | Pillai et al. |
| 2002/0055968 A1 | 5/2002 | Wishoff et al. |
| 2002/0059408 A1 | 5/2002 | Pattabhiraman et al. |
| 2002/0075844 A1 | 6/2002 | Hagen |
| 2002/0085719 A1 | 7/2002 | Crosbie |
| 2002/0087713 A1 | 7/2002 | Cunningham |
| 2002/0090089 A1 | 7/2002 | Branigan et al. |
| 2002/0091944 A1 | 7/2002 | Anderson et al. |
| 2002/0112183 A1 | 8/2002 | Baird, III et al. |
| 2002/0112186 A1 | 8/2002 | Ford et al. |
| 2002/0120741 A1 | 8/2002 | Webb et al. |
| 2002/0123335 A1 | 9/2002 | Luna et al. |
| 2002/0124078 A1 | 9/2002 | Conrad |
| 2002/0124103 A1 | 9/2002 | Maruyama et al. |
| 2002/0129143 A1 | 9/2002 | McKinnon, III et al. |
| 2002/0131404 A1 | 9/2002 | Mehta et al. |
| 2002/0133581 A1 | 9/2002 | Schwartz et al. |
| 2002/0133589 A1 | 9/2002 | Gubbi et al. |
| 2002/0136226 A1 | 9/2002 | Christoffel et al. |
| 2002/0138762 A1 | 9/2002 | Horne |
| 2002/0138763 A1 | 9/2002 | Delany et al. |
| 2002/0143964 A1 | 10/2002 | Guo et al. |
| 2002/0152284 A1 | 10/2002 | Cambray et al. |
| 2002/0162030 A1 | 10/2002 | Brezak et al. |
| 2002/0164952 A1 | 11/2002 | Singhal et al. |
| 2002/0165990 A1 | 11/2002 | Singhal et al. |
| 2002/0169867 A1 | 11/2002 | Mann et al. |
| 2002/0174227 A1 | 11/2002 | Hartsell et al. |
| 2002/0178282 A1 | 11/2002 | Mysore et al. |
| 2002/0199007 A1 | 12/2002 | Clayton et al. |
| 2003/0041104 A1 | 2/2003 | Wingard et al. |
| 2003/0043846 A1 | 3/2003 | Purpura et al. |
| 2003/0046370 A1 | 3/2003 | Courtney |
| 2003/0055994 A1 | 3/2003 | Herrmann et al. |
| 2003/0059038 A1 | 3/2003 | Meyerson et al. |
| 2003/0061506 A1 | 3/2003 | Cooper |
| 2003/0069956 A1 | 4/2003 | Gieseke et al. |
| 2003/0070170 A1 | 4/2003 | Lennon |
| 2003/0078784 A1 | 4/2003 | Jordan et al. |
| 2003/0087629 A1 | 5/2003 | Juitt et al. |
| 2003/0126608 A1 | 7/2003 | Safadi et al. |
| 2003/0135753 A1 | 7/2003 | Batra et al. |
| 2003/0149751 A1 | 8/2003 | Bellinger et al. |
| 2003/0154399 A1 | 8/2003 | Zuk |
| 2003/0159072 A1 | 8/2003 | Bellinger et al. |
| 2003/0163603 A1 | 8/2003 | Fry et al. |
| 2003/0172167 A1 | 9/2003 | Judge et al. |
| 2003/0177477 A1 | 9/2003 | Fuchs |
| 2003/0212800 A1 | 11/2003 | Jones et al. |
| 2003/0217126 A1 | 11/2003 | Polcha et al. |
| 2004/0015719 A1 | 1/2004 | Lee |
| 2004/0047356 A1 | 3/2004 | Bauer |
| 2004/0049586 A1 | 3/2004 | Ocepek et al. |
| 2004/0064836 A1 | 4/2004 | Ludvig et al. |
| 2004/0073941 A1 | 4/2004 | Ludvig et al. |
| 2004/0085906 A1 | 5/2004 | Ohtani |
| 2004/0093513 A1 | 5/2004 | Cantrell |
| 2004/0103426 A1 | 5/2004 | Ludvig et al. |
| 2004/0122956 A1 | 6/2004 | Myers et al. |
| 2004/0172557 A1 | 9/2004 | Nakae et al. |
| 2004/0177276 A1 | 9/2004 | MacKinnon et al. |
| 2004/0179822 A1 | 9/2004 | Tsumagari et al. |
| 2004/0181816 A1 | 9/2004 | Kim et al. |
| 2004/0199635 A1 | 10/2004 | Ta et al. |
| 2004/0210633 A1 | 10/2004 | Brown et al. |
| 2004/0268234 A1 | 12/2004 | Sampathkumar et al. |
| 2005/0021686 A1 | 1/2005 | Jai et al. |
| 2005/0044350 A1 | 2/2005 | White et al. |
| 2005/0044422 A1 | 2/2005 | Cantrell |
| 2005/0091303 A1 | 4/2005 | Suzuki |
| 2005/0138416 A1 | 6/2005 | Qian et al. |
| 2005/0149721 A1 | 7/2005 | Lu |
| 2005/0193103 A1 | 9/2005 | Drabik |
| 2005/0195854 A1 | 9/2005 | Agmon et al. |
| 2005/0204022 A1 | 9/2005 | Johnston et al. |
| 2005/0204031 A1 | 9/2005 | Johnston et al. |
| 2005/0204050 A1 | 9/2005 | Turley et al. |
| 2005/0204168 A1 | 9/2005 | Johnston et al. |
| 2005/0204169 A1 | 9/2005 | Tonnesen |
| 2005/0204402 A1 | 9/2005 | Turley et al. |
| 2006/0036723 A1 | 2/2006 | Yip et al. |
| 2006/0168229 A1 | 7/2006 | Shim et al. |

| | | | |
|---|---|---|---|
| 2006/0173992 | A1 | 8/2006 | Weber et al. |
| 2006/0184618 | A1 | 8/2006 | Kurup et al. |
| 2007/0073718 | A1 | 3/2007 | Ramer et al. |
| 2007/0186113 | A1 | 8/2007 | Cuberson et al. |
| 2007/0208936 | A1 | 9/2007 | Ramos Robles |
| 2007/0268878 | A1 | 11/2007 | Clements |
| 2008/0066096 | A1 | 3/2008 | Wollmershauser et al. |
| 2008/0120661 | A1 | 5/2008 | Ludvig et al. |
| 2008/0147840 | A1 | 6/2008 | Roelens et al. |
| 2008/0276305 | A1 | 11/2008 | Chan et al. |

FOREIGN PATENT DOCUMENTS

| | | | |
|---|---|---|---|
| WO | WO 0177787 | A3 | 10/2001 |
| WO | WO 0209458 | A2 | 1/2002 |
| WO | WO 0223825 | A1 | 3/2002 |
| WO | WO 0241587 | A3 | 5/2002 |
| WO | WO 02077820 | A1 | 10/2002 |
| WO | WO 03021890 | A1 | 3/2003 |
| WO | WO 03098461 | A1 | 5/2003 |
| WO | WO 2004034229 | A2 | 4/2004 |
| WO | WO 2004036371 | A2 | 4/2004 |
| WO | WO 2005020035 | A2 | 3/2005 |

OTHER PUBLICATIONS

Lingblom, Bluesocket's New Gateway Based on Open Standards—WGX-4000 Switch Wireless Gateway, CRN, Burlington, MA, found at www.crn.channelsupersearch.com, Apr. 21, 2003, 2 pages.

"Boingo Wireless Service Installed at LaGuardia Airport" Copyright 2003 M2Communications Ltd., found at www.findarticles.com, Dec. 8, 2003, 1 page.

"West Point Unwired: the Military Academy at West Point Continues to Lead the Way in High-Tech Curriculum with Wireless Classroom Networking," *Communication News*, Jun. 2003, Copyright 2003 M2 Communications Ltd., found at www.findarticles.com, 5 pages, printed Dec. 8, 2003.

Molta, "Wireless Hotspots Heat Up," Mobile & Wireless Technology, pp. 1-8, May 15, 2003, Copyright 2003 M2Communications Ltd., found at www.networkcomputing.com, printed Dec. 8, 2003, 8 pages.

Jackson, "Wireless at West Point: Officers of the Future Use IT in Class Now, in the Field Later (Technology Report)" Apr. 21, 2003, pp. 1-3, www.gcn.com.

Lingblom, Cranite Develops SMB Strategy, CRN, San Jose, CA, Jun. 23, 2003, 1 page.

Dornan, "Wireless LANs: Freedom vs. Security?" Network Magazine, Jul. 2003, pp. 36-39, www.networkmagazine.com.

O'Shea, "PCTEL looks past patent suit toward fusion of Wi-Fi, PC" Telephony.online, Jun. 2, 2003, pp. 1-2, found at www.telephonyonline.com, Primedia Business Magazines and Media, printed Dec. 8, 2003.

O'Shea, "Boingo to Launch Initiative Aimed at Carrier Market" Telephony.online, Mar. 10, 2003, 1 page, found at www.telephonyonline.com, Primedia Business Magazines and Media, printed Dec. 8, 2003.

International Search Report for PCT/US03/32912 dated Apr. 8, 2004, 6 pages.

International Search Report for PCT/US03/32268 dated Oct. 29, 2004, 6 pages.

Fan et al, "Distributed Real Time Intrusion Detection System for 3G," Proceedings of ICCC2004, 2004, pp. 1566-1570.

Yu et al., "Fuzzy Logic Based Adaptive Congestion Control Scheme for High-Speed Network," vol. 33, No. 4, Information and Control, Aug. 2004, pp. 389-393.

Hamano et al., "A Redirection-Based Defense Mechanism Against Flood-Type Attacks in Large Scale ISP Networks," 10th Asia-Pacific Conference on Communications and 56th International Symposium on Multi-Dimensional Mobile Communications, 2004, pp. 543-547.

Sarolahti, "Congestion Control on Spurious TCP Retransmssion Timeouts," Globecom 2003, pp. 682-686.

Estevez-Tapiador et al., "Measuring Normality in HTTP Traffic for Anomaly-Based Intrusion Detection," Computer Networks 45 (2004), pp. 175-193.

Xing et al., "A Survey of Computer Vulnerability Assessment," Chinese Journal of Computers, vol. 27, No. 1, Jan. 2004, pp. 1-11.

Wen et al. "Development of a Snort-Based Security Network Management and Real-Time Intrusion Detection System," Journal of Beijing Normal University (Natural Science), vol. 40, No. 1, Feb. 2004, pp. 40-43.

Thottethodi et al., "Exploiting Global Knowledge to Achieve Self-Tuned Congestion Control for k-Ary n-Cube Networks," IEEE Transactions on Parallel and Distributed Systems, vol. 15, No. 3, Mar. 2004, pp. 257-272.

Trabelsi et al., "Malicious Sniffing Systems Detection Platform," 2004 IEEE, pp. 201-207.

Guangzhi et al., "A Framework for Network Vulnerability Analysis," Proceedings of the IASTED International Conference, Communications, Internet & Information Technology, Nov. 2004, pp. 289-294.

Albuquerque et al., "Network Border Patrol: Preventing Congestion Collapse and Promoting Fairness in the Internet," IEEE/ACM Transactions on Networking, vol. 12, No. 1, Feb. 2004, pp. 173-186.

Wirbel, Loring, "Security Stampede Could Flatten IPSec," Network Magazine, Jan. 2004, p. 12.

MacLeod, C., "Freeing the Shackles with Secure Remote Working," Comtec Oct. 2003, pp. 66-67.

Fisher, D., "SSL Simplifies VPN Security," IT Week, Nov. 10, 2003, p. 40.

Conry-Murray, A., "SSL VPNs: Remote Access for the Masses," Network Magazine, Oct. 2003, pp. 26-32.

"Permeo Supports Microsoft Network Access Protection for Simplified Secure Remote Access; Permeo's Base5 Support of Microsoft Technology Provides "Zero Touch" Policy Enforcement", Apr. 25, 2005, 2 pages, newswire, found at www.nerac.com.

Permeo Drives Out Operational Costs, Simplifies Secure Remote Access, Mar. 25, 2005, 2 pages, newswire, found at www.nerac.com.

"Netilla Lauches SSL VPN for Citrix. (Industry Briefs) (Virtual Private Networks) (Brief Article)," Sep. 20, 2004, 2 pages, Computer Reseller News, found at www.nerac.com.

"Netilla Lauches Secure Gateway Appliance Family of Application-Specific SSL VPN Products; Initial SGA-C Model Provides Secure Remote Access to Citrix MetaFrame Presentation Server Installations . . . " Sep. 13, 2004, 3 pages, PR Newswire, found at www.nerac.com.

"Secure Remote Access.(Network Security) (VPN Gateway 4400 Series) (Brief Article)," Mar. 1, 2004, 2 pages, Communication News, vol. 41, found at www.nerac.com.

"Fortinet and Aventail Deliver Joint Solution for Clientless Remote Access with High-Performance Antivirus Protection; Integrated SSL VPN and Antivirus Offering Provides Clientless Remote Access with Complete Content Security", Jan. 5, 2004, 3 pages, PR Newswire, found at www.nerac.com.

Hamblen, Matt, "Cisco Targets SSL VPN Vendors, Adds Support for Clientless Security Protocol: Installed Base of VPN Devices May Give it an Edge, Despite Late Entry," Nov. 17, 2003, 3 pages, Computerworld, vol. 37, No. 46, found at www.nerac.com.

Hamzeh, et al., "Point-to-Point Tunneling Protocol—PPTP RFC 2637" Network Working Groups, Jul. 1999, pp. 1-54.

International Search Report and Written Opinion for related International Application No. PCT/US04/29249 dated Dec. 15, 2005, 11 pages.

Pfleeger, Charles P., "Security in Computing, " PTR Prentice-Hall, Inc., 1989, 2 title pages and pp. 364-415.

Office Action issued in U.S. Appl. No. 10/922,041, dated Jul. 13, 2007.

Stone, David, "Securing Wireless LANs with VPN", Intel Information Technology White Paper, May 2006, 8 pages.

Office Action issued in U.S. Appl. No. 10/683,317, dated Oct. 9, 2007.

Office Action issued in U.S. Appl. No. 10/687,002, dated Oct. 18, 2007.

Office Action issued in U.S. Appl. No. 11/078,223, dated Oct. 31, 2007.

Office Action issued in U.S. Appl. No. 11/076,652, dated Jan. 25, 2008.

Office Action issued in U.S. Appl. No. 10/687,002, dated Apr. 17, 2008.

Office Action issued in U.S. Appl. No. 10/683,317, dated Jun. 9, 2008.

Office Action issued in U.S. Appl. No. 11/076,672, dated Jul. 9, 2008.
Office Action issued in U.S. Appl. No. 11/076,652, dated Jul. 22, 2008.
Office Action issued in U.S. Appl. No. 11/076,591, dated Aug. 13, 2008.
Office Action issued in U.S. Appl. No. 11/076,719, dated Sep. 4, 2008.
SBC Technology Resources, Inc., XNMP-XML Network Management Protocol and Interface, Jul. 19, 2002, pp. 1-9, http://www.ieff.org/proceedings/02jul/slides.
Shim, Choon B., " XNMP for IP Telephony Management," Enterprise Networks & Servers, Jun. 2, 2006, 7 pages.
Office Action issued in U.S. Appl. No. 11/076,652, dated Dec. 11, 2008.
Office Action issued in U.S. Appl. No. 10/687,002, dated Jan. 7, 2009.
Office Action issued in U.S. Appl. No. 11/076,672, dated Feb. 3, 2009.
Oh, et al., "Interaction Translation Methods for XML/SNMP Gateway," Jul. 11, 2003, retrieved from http://web-archive.org/web/20030711162412/http://dpnm.postech.ac.kr/papers/DSOM/02/xml-snmp-gateway/xml-snmp-gateway.pdf, pp. 1-12.
Office Action issued in U.S. Appl. No. 10/683,317, dated Feb. 11, 2009.
Office Action issued in U.S. Appl. No. 11/076,591, dated Feb. 13, 2009.
International Preliminary Report on Patentability, PCT/US03/032268, dated Apr. 10, 2005, 3 pgs.
International Preliminary Report on Patentability, PCT/US03/032912 dated Apr. 16, 2005, 3 pgs.
International Preliminary Report on Patentability, PCT/US04/029249, dated Feb. 21, 2006, 6 pgs.
Office Action issued in U.S. Appl. No. 11/076,719, dated Mar. 17, 2009.
Office Action issued in U.S. Appl. No. 10/922,041, dated Dec. 6, 2005.
Office Action issued in U.S. Appl. No. 10/922,041, dated Mar. 30, 2006.
Office Action issued in U.S. Appl. No. 10/922,041, dated Aug. 11, 2006.
Office Action issued in U.S. Appl. No. 10/922,041, dated Jan. 30, 2007.
Office Action issued in U.S. Appl. No. 10/683,317, dated Apr. 5, 2007.
Office Action issued in U.S. Appl. No. 10/687,002, dated May 2, 2007.
Office Action issued in U.S. Appl. No. 10/922,041, dated May 8, 2009.
Office Action issued in U.S. Appl. No. 11/076,672, dated Jul. 21, 2009.
Notice of Allowability issued in U.S. Appl. No. 11/076,646, dated Jul. 24, 2009.
Crandell et al., "A Secure and Transparent Firewall Web Proxy," Oct. 2003, USENIX, Retrieved from the internet on Jul. 15, 2009: <URL: http://www.usenix.org/event/lisa03/tech/full_papers/crandell/crandell.pdf>.
Sommerlad, "Reverse Proxy Patterns," 2003 Retrieved from the Internet on Jul. 15,2 009, 27 pages; <URL: http://www.modsecurity.org/archive/ReverseProxy-book-1.pdf>.
Office Action issued in U.S. Appl. No. 11/076,591, dated Aug. 6, 2009.
Office Action issued in U.S. Appl. No. 10/683,317, dated Aug. 18, 2009.
Rashti et al, "A Multi-Dimensional Packet Classifier for NP-Based Firewalls," Proceedings of the 2004 International Symposium on Applications and the Internet, Jan. 2004, 5 pages, from the internet, Aug. 12, 2009: <URL: http://ieeexplore.ieee.org/stamp/stamp.jsp?tp=&arnumber=1266123&isnumber=28312>.
Williamson, Matthew, "Throttling Viruses: Restricting Propagation to Defeat Malicious Mobile Code," Proceedings of the 18th Annual Computer Security Applications Conference, 2002 IEEE, 8 pages.
Williamson, et al, "Virus Throttling," Virus Bulletin Research Feature 1, Mar. 2003, 4 pages.

* cited by examiner

CONFIGURATION FOR SUSPICION ACCUMULATOR

DEFINITION OF CHT (CLIENT HISTORY TRACKING) STRUCTURES

| ROWNAME | # CELLS | TIME/CELL | CONTENT SPECIFICATION |
|---|---|---|---|
| Portscan1 | 6 | 10s | ACCUMULATE POINTS FROM PACKET NOTICES |
| Portscan2 | 5 | 60s | AGGREGATE FROM Portscan1 OVER TIME |
| Portscan3 | 3 | 300s | AGGREGATE FROM Portscan2 OVER TIME |
| PortscanSpike | 6 | 10s | TRACK CELL-TO-CELL CHANGE FROM Portscan1 |
| ... | | | |
| Spam1 | 10 | 60s | ACCUMULATE POINTS FROM PACKET NOTICES |
| ... | | | |
| PortReconIndex | 6 | 20s | SET VALUE (Portscan1 VALUE) + (3 x NewPartnerCount1 VALUE) + ... |

32

MAPPING OF RULE TAGS TO CHT ROWS

| OBSERVATION RULE TAG | TARGET CHT ROWNAME | POINT SCALING FACTOR |
|---|---|---|
| PORTSCANNING-HIGHPORT | Portscan1 | 1 |
| PORTSCANNING-PRIVILEGEDPORT | Portscan1 | 3 |
| ... | | |
| SPAMMING | Spam1 | 1 |
| ... | | |

33

DEFINITION OF TESTS AND THRESHOLDS TO BE PERIODICALLY APPLIED TO CHT STRUCTURES

| TEST # | CHT ROWNAME | TEST DESCRIPTION |
|---|---|---|
| 1 | Portscan1 | ALERT IF ANY 200 POINTS COLLECTED IN 10 SECONDS |
| 2 | Portscan1 | ALERT IF ANY 600 POINTS COLLECTED IN 60 SECONDS |
| 3 | Portscan2 | ALERT IF ANY 900 POINTS COLLECTED IN 3 MINUTES |
| ... | | |
| 9 | PortscanSpike | ALERT IF ANY CELL > 80 |
| ... | | |
| 14 | Spam1 | ALERT IF ANY TWO CELLS > 3 |
| ... | | |
| 22 | PortReconIndex | ALERT IF THE SUM OF ANY 3 OUT OF 5 CELLS EXCEEDS 110 |
| ... | | |

CLIENT LOOKUP TABLE
IP ADDRESS     (POINTER/INDEX)

192.168.0.17   58
192.168.0.50   6
192.168.1.100  1123
...

LRU OF CHT STRUCTURES THAT
ARE CURRENTLY ASSIGNED TO CLIENTS:

POOL OF FREE CHT STRUCTURES:

CLIENT HISTORY TRACKING (CHT) STRUCTURE IS
DEFINED BY CONFIGURATION:

| | | | | | | | | | | |
|---|---|---|---|---|---|---|---|---|---|---|
| "Portscan1": | 0 | 0 | 3 | 10 | 40 | 0 | | | | |
| "Portscan2": | 53 | 0 | 0 | 0 | 0 | | | | | |
| "Portscan3": | 0 | 53 | 0 | | | | | | | |
| "PortscanSpike": | 0 | 0 | 3 | 7 | 30 | 40 | | | | |
| "Spam1": | 0 | 0 | 0 | 0 | 0 | 0 | 0 | 0 | 2 | 0 |
| ... | | | | | | | | | | |
| "PortReconIndex": | 0 | 0 | 6 | 25 | 80 | 0 | | | | |

— ROW OF CELLS
— CELL
— CELL VALUE

*FIG. 5*

SYSTEM AND METHOD FOR DETECTION OF ABERRANT NETWORK BEHAVIOR BY CLIENTS OF A NETWORK ACCESS GATEWAY

RELATED APPLICATIONS

This application is a continuation of and claims priority under 35 U.S.C. §120 to U.S. patent application Ser. No. 11/076,652, filed Mar. 10, 2005, entitled "SYSTEM AND METHOD FOR DETECTION OF ABERRANT NETWORK BEHAVIOR BY CLIENTS OF A NETWORK ACCESS GATEWAY", by Steven D. Tonnesen, which in claims priority under 35 U.S.C. 119(e) to U.S. Provisional Patent Application No. 60/551,697, filed Mar. 10, 2004, entitled "SYSTEM AND METHOD FOR DETECTION OF ABERRANT NETWORK BEHAVIOR BY CLIENTS OF A NETWORK ACCESS GATEWAY" by Steven D. Tonnesen, which is hereby fully incorporated by reference herein.

TECHNICAL FIELD OF THE INVENTION

Embodiments of the present invention relate to network security. More particularly, embodiments of the present invention relate to client management in networks organized using network access gateways.

BACKGROUND

The communication of data over networks has become an important, if not essential, way for many organizations and individuals to communicate. The Internet is a global network connecting millions of computers in which any computer connected to the Internet can potentially receive data from and send data to any other computer connected to the Internet. The Internet provides a variety of methods in which to communicate data, one of the most ubiquitous of which is the World Wide Web. Other methods for communicating data over the Internet include e-mail, usenet newsgroups, telnet, FTP, audio streams, and video streams.

Users typically access the Internet either through a computer connected to an Internet Service Provider ("ISP") or computer connected to a local area network ("LAN") provided by an organization, which is in turn, connected to the ISP. The ISP provides a point of presence to interface with the Internet backbone. Routers and switches in the backbone direct data traffic between the various ISPs.

To access a LAN and, in turn, the Internet, many organizations use a network access gateway to act as a consolidation point for traffic entering or leaving the LAN.

In this network topology, all of the clients using the same network access gateway share a common "backhaul" network connection to the ISP. Any network traffic traveling between a client computer on the LAN and the Internet must therefore pass through (i.e. be "routed" by) the network access gateway.

One common use of a network access gateway is to provide "NAT" (Network Address Translation) services to clients on the LAN. This function allows a single outward-facing IP address to be reused for some purposes by multiple clients inside the LAN. This feature is sometimes referred to as "IP masquerading".

The routing nature and IP masquerading nature of network access gateways often prevent an upstream ISP from sufficiently observing the traffic on the LAN side of the gateway. Particularly when NAT is enabled, the ISP is often unable to correlate traffic on the backhaul to particular clients behind the gateway.

Computers sometimes fall victim to malicious software ("malware") such as worms and viruses, which exploit vulnerabilities in the victim to gain control.

Once malware has infected a victim computer, a typical behavior is to attempt self-propagation. To propagate, the malware must find and infect other vulnerable computers. The search for additional victims is often conducted at a high rate of speed by means of network reconnaissance. The speed and intensity of the reconnaissance is often bound only by the available processor and network bandwidth resources.

Some types of malware are constructed so as to bombard a third-party victim with excessive network traffic. This case is sometimes referred to as a DoS (Denial of Service) attack. It may be referred to as a DDoS (Distributed Denial of Service) attack when there are many coordinated attackers.

Some types of malware do not produce persistent high volumes of network traffic. Clients infected with this type of malware are still at high risk because security measures have failed. These clients may also pose an additional threat to other LAN clients at any future time.

Yet another potential source of hostile network traffic is a user who intentionally operates a computer program that is designed to produce such traffic.

Whenever a LAN client or a number of LAN clients are subjected to traffic of sufficient volume and type, the LAN and/or the backhaul can become congested with the excessive traffic. This network congestion is a problem even for otherwise uninvolved LAN clients because of the reduction in the effective bandwidth of the shared backhaul. The congestion is a problem for the ISP because of bandwidth limitations and because of the costs associated with providing remediation and customer support. Furthermore, other computers both inside and outside of the LAN may become burdened by receiving excessive traffic.

Because of the inability of the ISP to observe or attribute LAN traffic behind a gateway to specific clients, it is difficult or impossible for the ISP to remotely assign responsibility or take corrective action against the infected clients or perpetrators.

One prior art method of finding the sources of network offenses is to take remote control of the gateway from upstream and to begin examining all of the LAN traffic manually. However, this scheme requires manual action, proper network observation tools on the gateway, and sufficient skill on the part of the analyst. This approach is also predicated on having enough remaining network capacity on the backhaul and enough remaining processing power on the gateway in order to successfully conduct the examination.

Another prior art method of finding the sources of network offenses is to physically or logically disconnect and reconnect clients while monitoring the network traffic on the gateway. However, this approach will disrupt the connectivity of innocent/uninfected clients. Further, it imposes requirements upon the LAN network architecture and typically requires human intervention throughout a potentially lengthy process.

SUMMARY OF THE INVENTION

Embodiments of the present invention provide a system and method of detecting aberrant network behavior by clients of a network access gateway that eliminates, or at least reduces, the shortcomings of prior art detection systems and methods. One embodiment of the present invention provides a system of detecting aberrant network behavior behind a network access gateway comprising a processor, a first network interface coupled to the processor, a second network interface coupled to the processor, a storage media accessible by the processor and a set of computer instructions stored on the storage media, executable by the processor. In one embodiment of the present invention, the computer instructions can be executable to observe network communications arriving at the first network interface from multiple clients and determine when the traffic of a particular client is indicative of malware infection or other hostile network activities. If any network communications are judged to be aberrant, the computer instructions can be executable to log such activity to storage media, or to notify an administrative entity via either the first network interface or second network interface, or to apply access controls upon particular clients' traffic.

Embodiments of the present invention provide an advantage over prior systems and methods of detecting aberrant network behavior by clients of a network access gateway by being able to operate without human intervention.

Embodiments of the present invention provide another advantage over prior systems and methods of detecting aberrant network behavior by clients of a network access gateway by requiring a lesser skill level when conducting manual traffic analysis.

Embodiments of the present invention provide another advantage over prior systems and methods of detecting aberrant network behavior by providing an observational approach that can continuously monitor all LAN traffic.

Embodiments of the present invention provide another advantage over prior systems and methods of detecting aberrant network behavior by providing an approach that does not require the disconnection of LAN clients to determine the source of the traffic in question.

Embodiments of the present invention provide another advantage over prior systems and methods of detecting aberrant network behavior by not requiring that a usable network connection exist between the network access gateway and the point of administrative control.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein:

FIG. 4 is a diagrammatic representation of an example configuration for a software module for accumulating information about suspected aberrant network behavior by clients of a network gateway, according to one embodiment of the present invention;

FIG. 5 is an example representation of some data structures used in one embodiment of the present invention.

DETAILED DESCRIPTION

Figure 1:
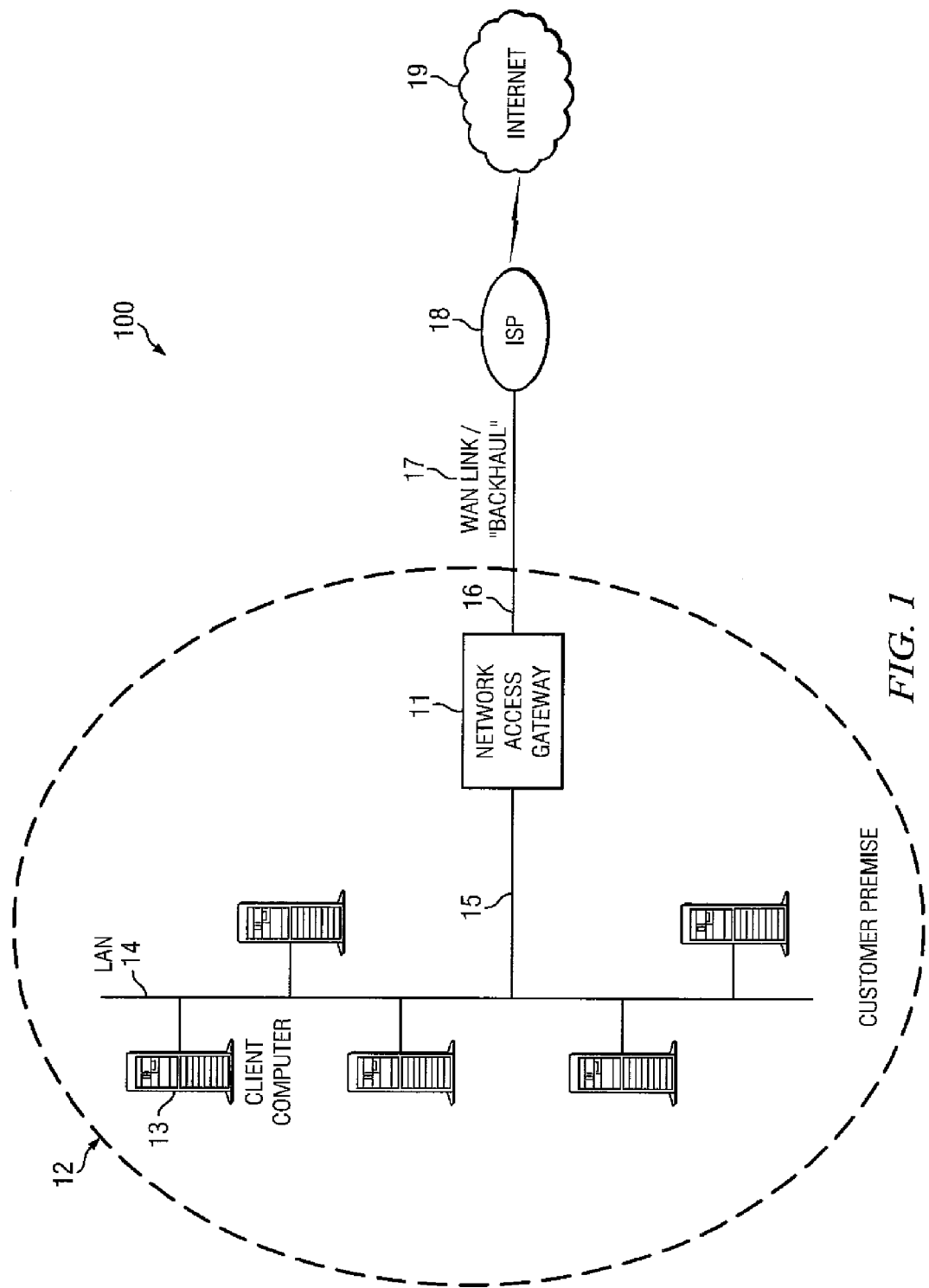
FIG. 1 is a diagrammatic representation of an example network illustrating an environment where a system for detecting aberrant network behavior by clients of a network gateway could exist according to one embodiment of the present invention.

The following applications are hereby fully incorporated by reference herein in their entirety: U.S. application Ser. No. 10/683,317, filed Oct. 10, 2003 entitled "SYSTEM AND METHOD FOR PROVIDING ACCESS CONTROL," by Richard MacKinnon, Kelly Looney, and Eric White; U.S. Provisional Application No. 60/551,698, filed Mar. 10, 2004 entitled "SYSTEM AND METHOD FOR BEHAVIOR-BASED FIREWALL MODELING," by Patrick Turley which converted into U.S. application Ser. No. 11/076,719, filed Mar. 10, 2005 entitled "SYSTEM AND METHOD FOR BEHAVIOR-BASED FIREWALL MODELING," by Richard MacKinnon, Kelly Looney, and Eric White; U.S. Provisional Application No. 60/551,754, filed Mar. 10, 2004 entitled "SYSTEM AND METHOD FOR COMPREHENSIVE CODE GENERATION FOR SYSTEM MANAGEMENT," by Keith Johnston which converted into U.S. application Ser. No. 11/078,223 filed Mar. 10, 2005 entitled "SYSTEM AND METHOD FOR COMPREHENSIVE CODE GENERATION FOR SYSTEM MANAGEMENT," by Keith Johnston; U.S. Provisional Application No. 60/551,703, filed Mar. 10, 2004 entitled "SYSTEM AND METHOD FOR PROVIDING A CENTRALIZED DESCRIPTION/CONFIGURATION OF CLIENT DEVICES ON A NETWORK ACCESS GATEWAY," by Patrick Turley and Keith Johnston; U.S. Provisional Application No. 60/551,702, filed Mar. 10, 2004 entitled "SYSTEM AND METHOD FOR ACCESS SCOPE CONTROL ("WALLED GARDENS") FOR CLIENTS OF A NETWORK ACCESS GATEWAY," by Patrick Turley, Keith Johnston, and Steven D. Tonnesen which converted into U.S. application Ser. No. 11/076,591, filed Mar. 10, 2005 entitled "METHOD AND SYSTEM FOR CONTROLLING NETWORK ACCESS," by Patrick Turley, Keith Johnston, and Steven D. Tonnesen; U.S. Provisional Application No. 60/551,699, filed Mar. 10, 2004 entitled "SYSTEM AND METHOD FOR DYNAMIC BANDWIDTH CONTROL," by Patrick Turley, et al.; U.S. Provisional Application No. 60/551,697, filed Mar. 10, 2004 entitled "SYSTEM AND METHOD FOR DETECTION OF ABERRANT NETWORK BEHAVIOR BY CLIENTS OF A NETWORK ACCESS GATEWAY," by Steven D. Tonnesen which converted into U.S. application Ser. No. 11/076,652, filed Mar. 10, 2005 entitled "SYSTEM AND METHOD FOR DETECTION OF ABERRANT NETWORK BEHAVIOR BY CLIENTS OF A NETWORK ACCESS GATEWAY," by Steven D. Tonnesen; U.S. Provisional Application No. 60/551,705, filed Mar. 10, 2004 entitled "SYSTEM AND METHOD FOR DOUBLE-CAPTURE/DOUBLE-REDIRECT TO A DIFFERENT LOCATION," by Keith Johnston, et al. which converted into U.S. application Ser. No. 11/076,646 filed Mar. 10, 2005 entitled "SYSTEM AND METHOD FOR DOUBLE-CAPTURE/DOUBLE-REDIRECT TO A DIFFERENT LOCATION," by Keith Johnston, et al.; U.S. Provisional Application No. 60/551,704, filed Mar. 10, 2004 entitled "SYSTEM AND METHOD FOR NETWORK MANAGEMENT XML ARCHITECTURAL ABSTRACTION," by Keith Johnston and Mario Garcia which converted into U.S. application Ser. No. 11/076,672 filed Mar. 10, 2005 entitled "SYSTEM AND METHOD FOR NETWORK MANAGEMENT XML ARCHITECTURAL ABSTRACTION," by Keith Johnston and Mario Garcia; and U.S. Provisional Application No. 60/660,408, filed Mar. 10, 2005 entitled "SYSTEM AND METHOD FOR PROVIDING A CENTRALIZED DESCRIPTION/CONFIGURATION OF CLIENT DEVICES ON A NETWORK ACCESS GATEWORK," by Patrick Turley, et al.

Preferred embodiments of the invention are illustrated in the FIGURES, like numerals being used to refer to like and corresponding parts of the various drawings.

Embodiments of the present invention provide a system and method of detecting aberrant network behavior by clients of a network access gateway. According to one embodiment of the present invention, a control device can sit between two networks (e.g., an Internet, a LAN or other network) functioning as a network access gateway (or gateway). As used herein, a network access gateway means any device with one or more network interfaces (of any type) that employs some form of control instruction(s) to observe, route, switch, filter, monitor, transfer, or otherwise make determinations about network traffic between one or more logical or physical network divisions or devices. This can include both "one-armed" and "observational" cases where the device performing the functions of the invention (e.g., the network access gateway) is attached to a single observed network). It should be recognized that a network access gateway is only one embodiment for implementing the aberrant behavior detection of the present invention. The detection system can reside within the gateway and monitor all network traffic passing through the gateway. When clients of the gateway produce problematic or suspicious types of network traffic that are observable by the gateway, the detection system can accumulate statistical or summary information about such traffic. If over time, the volume, type and/or pattern of aberrant traffic meet configurable thresholds, the detection system can perform configurable actions in response. Example response actions could include logging data about the event to storage or alerting another entity of the event. The entity notified of the event could be another portion of the gateway or software module inside or outside of the network gateway, or it could be any computer or computers networked to the gateway. Examples of the latter could be an administrative console or a monitoring system operated by an ISP. As used herein, client(s) of the gateway, client(s) of the network gateway or simply client(s), mean network entities or devices (and components, software, etc. thereof) on a gateway connected network. A client can be any networked computing device (or even logical computing device that shares a connection).

FIG. 1 is a diagrammatic representation of an example network topology 100 illustrating an environment where an embodiment of the present invention could be used. Client computers 13 on a LAN network 14 located in a customer premise 12 are connected to the Internet 19 via a network access gateway 11. The gateway 11 has two network interfaces, a LAN interface 15 and a WAN interface 16. All network traffic from the client computers 13 bound for the Internet 19 are routed by the gateway 11 over the shared WAN link 17 to an Internet Service Provider (ISP) 18. The ISP 18 routes network traffic to and from the Internet 19.

It should be noted that FIG. 1 is provided by way of example only. In other embodiments of the present invention, the networks attached to the control device 11 can be any networks known in the art including, but not limited to, LANs, WANs, the Internet, global communications networks, wireless networks and/or any other communications network.

According to one embodiment of the present invention, client computer 13 can comprise any computing device known in the art (e.g., desktop, laptop, PDA, mobile phone or any other device capable of network communication) and can be connected to control device 11 in any manner known in the art (e.g., by LAN, wireless network, direct connection or other manner known in the art).

Figure 2:
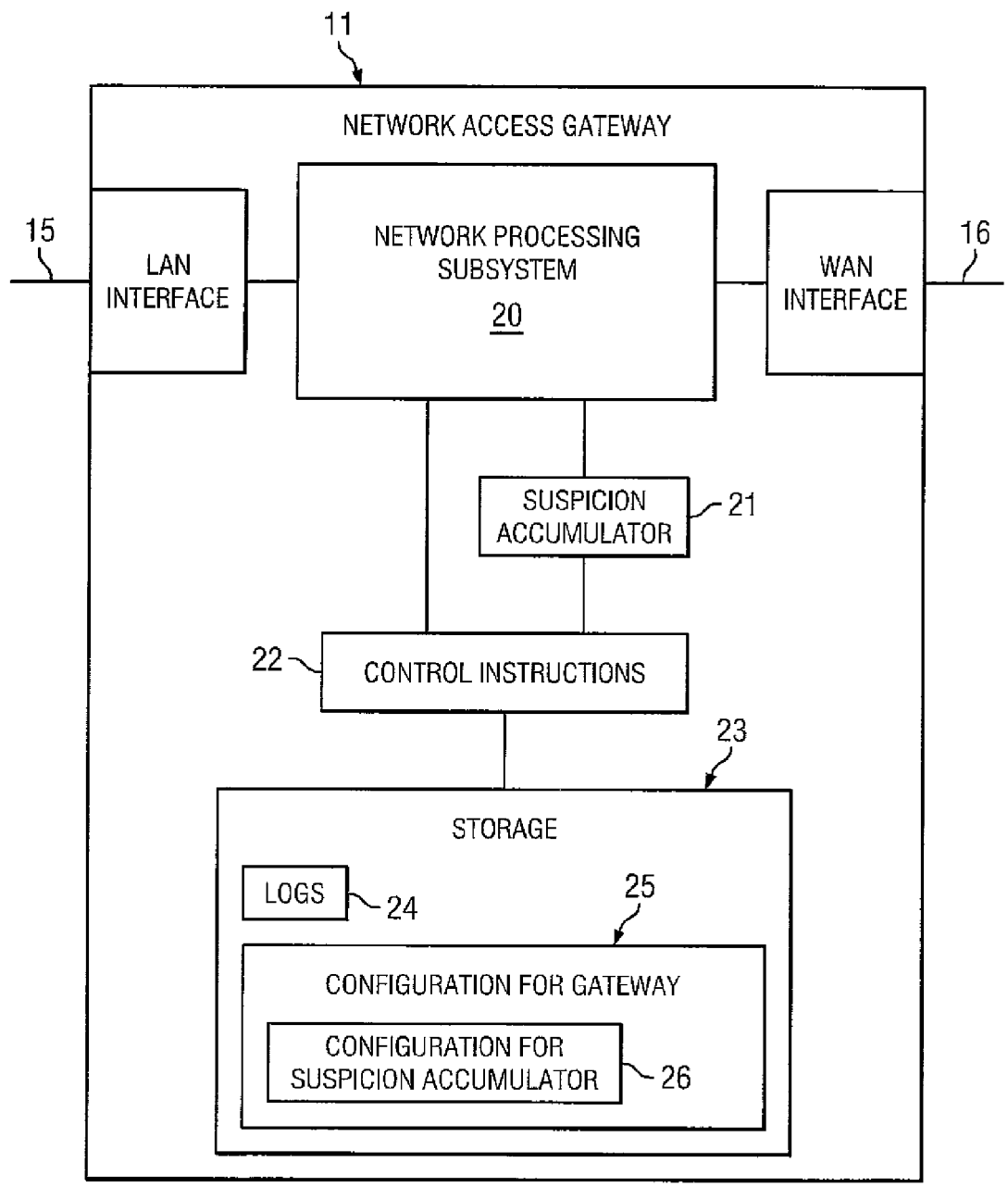
FIG. 2 is a diagrammatic representation of a network access gateway illustrating one embodiment a method for detecting aberrant network behavior by clients of a network gateway.

FIG. 2 is a diagrammatic representation of one embodiment of the network access gateway 11 of FIG. 1 illustrating one embodiment of a method for detecting aberrant network behavior. Client traffic (e.g., data) arriving on the LAN interface 15 is received by the network processing subsystem 20 where control instructions 22 are applied. The control instructions 22 may be derived in part or whole from the gateway configuration 25. The control instructions may cause the network processing subsystem 20 to discard, alter, reprioritize and/or deliver the client traffic to the WAN interface 16. In this embodiment of the method, the subsystem 20 can also notify the suspicion accumulator 21 with a copy of the traffic or with summary information about the traffic and the conditions under which the traffic was observed.

In this embodiment of the present invention, the suspicion accumulator 21 system collects and analyzes summary and statistical information about client traffic. Summary information can include, for example, packet header information (such as OSI layer 2 and layer 3 header information). For example, in a TCP/IP packet, header information can include source and destination MAC addresses, source and destination network addresses and ports, protocol number, etc. The accumulator 21 checks its collected data for each client, and applies instructions from the configuration 26 to determine if and when a particular client's traffic should be considered aberrant.

In this embodiment of the detection system within network access gateway 11, when the suspicion accumulator 21 determines that a particular client's traffic should be considered aberrant, the gateway 11 can perform response actions specified by the control instructions 22. Example response actions include: storing a record of the condition in the gateway's logs 24, notifying other portions of the instructions 22, or notifying an external entity via the LAN interface 15 or WAN interface 16. For the sake of example, such notifications could occur using an SNMP trap.

Figure 3:
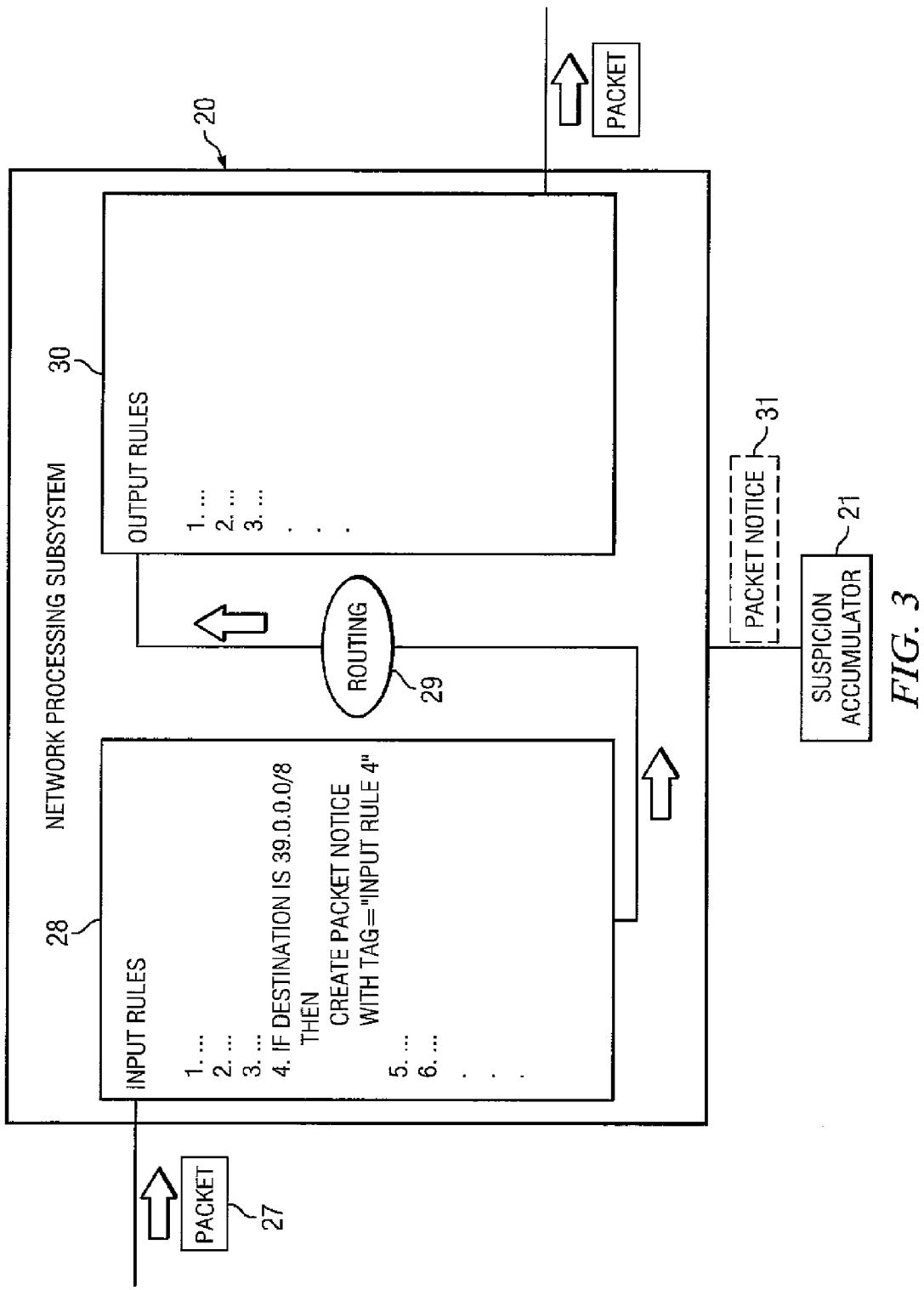
FIG. 3 is a diagrammatic representation of a portion of a network access gateway illustrating one embodiment of an observation method for detecting aberrant network behavior by clients of the network access gateway.

FIG. 3 is a diagrammatic representation of one embodiment of a portion of a network access gateway 11 illustrating one embodiment of an observation method for detecting aberrant network behavior by clients of the network access gateway 11. The network processing subsystem 20 in this example receives traffic in the form of a packet 27. In a typical traversal of the subsystem 20, each packet is examined according to a sequence of input rules 28. If the packet being handled is not discarded by any of the input rules, a routing decision 29 is made. Following the routing step 29, a sequence of output rules 30 is similarly applied before the packet leaves the subsystem.

In the embodiment of the detection system exemplified in FIG. 3, the input rules 28 and output rules 30 can be used to identify particular packets likely to be indicative of aberrant network behavior by a client. For the sake of example, the fourth enumerated rule of the input rule set 28 examines the destination of each IP packet 27 for addresses in a currently unassigned range 39.0.0.0/8. When a packet matches this rule, a packet notice 31 is delivered to the suspicion accumulator 21. The packet notice 31 contains summary information about the packet 27 (such as source IP address, source MAC address, destination IP address, protocol number, etc.). The packet notice 31 also contains additional information about the rule that triggered the generation of the packet notice (in this case a rule tag indicates the packet notice is a result of the fourth enumerated rule from the set of input rules 28).

It should be noted that in the embodiment depicted in FIG. 3, the input rules 28 are present to illustrate the relationship of the rules to the flow of packets and the relationship to the creation of packet notices 31. The example illustrates only a single means by which client traffic can be identified as potentially suspicious. In this case, a packet addressed to a currently invalid address range indicates that a randomized search operation could be being conducted by a worm. Many other means of identifying packets as suspicious exist in the art and should be known to a practitioner. Examples of means to identify suspicious packets include: packets with destination addresses which have not been assigned or are otherwise forbidden or illogical, packets directed to a blacklisted host, packets that represent new connections to a large number of remote destinations within a short period of time, packets that appear to be part of a port scanning operation, packets that contain content known to be associated with hostile activity, packets with MAC addresses that do not match reserved MAC/IP pairings known to the gateway, packets indicating an excessive number SMTP connections or ICMP contacts within a short period of time, excessive ICMP 'Destination Unreachable' packets returning from the Internet, packets that are malformed or illegal in some way according to network protocol definitions, etc.

In one embodiment of the present invention, traffic observation rules can be implemented within a Linux system by using netfilter matches within iptables. As would be understood by those of ordinary skill in the art, iptables allows construction of linked sequence of rules that can be used to discriminate, sort, test, alter, and otherwise act upon network traffic at the packet level.

In one embodiment of the present invention, the delivery mechanism from the network processing subsystem to the suspicion accumulator can be accomplished in a Linux system by using the "ULOG" netfilter action to transfer information about matched packets to the "ulogd" daemon. As would be understood by those of ordinary skill in the art, ulogd allows customized packet decoding and delivery to additional entities such as the suspicion accumulator 21.

It should be noted that because of the ability to discriminate individual clients or client, the observation rules used by the detection system can be user-specific. Further, the observation rules and detection thresholds may be dynamically adjustable for reasons such as optimization of system performance or correction of sensitivity to certain types of traffic.

It should be further noted that the use of dynamic variations in detection system sensitivity or configuration can be implemented in any suitable manner, as would be understood by those of ordinary skill in the art.

FIG. 4 is a representation of one embodiment of a configuration for a suspicion accumulator 26 as could be used for detecting aberrant network behavior. The first section 32 of the configuration 26 defines the structure of a data storage element that can be used for tracking the history of a particular client over a period of time. This structure is termed a CHT (Client History Tracking structure) and is further depicted internally in FIG. 5. CHT structures conceptually consist of a number of rows of data cells, where each cell is capable of holding a data value, and each row may contain a different number of cells, as specified by the configuration. Over time, the cells within a particular row become filled with data, and system is capable of reusing the cells by "wrapping" around the row. Auxiliary tracking information can be maintained to implement the wrapping capability. The approach thus uses a fixed memory size for each CHT structure.

The second configuration section 33 defines a mapping table which ties observation rule tags (as used in rules 28 from FIG. 3) to data row names as defined in the CHT definition 32. Any particular rule tag may have zero or more mapping entries. Each entry the mapping table can also contain an associated scaling factor, which can be used by a configuration designer to multiply the effect of an observation rule in application to certain CHT rows. This allows a particular CHT row to potentially receive separately scaled input from multiple rule tag mapping entries.

The third configuration section 34 in this embodiment of the present invention defines tests and threshold limits that are to be applied to the data contained in CHT structures in order to determine the presence of abnormal network behavior by a client. Each test will be applied to a single CHT row. Zero or more tests can be applied for any particular CHT row name.

The test descriptions in configuration section 34 are intended to illustrate for the sake of example the basic types of mathematical or algorithmic tests that can be applied to historical observations tracked on a per-client basis by this embodiment of the system. As would be obvious to any practitioner of the art, there are numerous possible ways to represent, define, declare, or specify these operations. Further, it should be anticipated that more sophisticated mathematical operations than shown in the figures (such as correlation and predictive extrapolation) will be useful in the accurate detection of aberrant network behavior.

FIG. 5 is a representation of several embodiments of data structures that can be used in first section 32 of configuration 26 (see FIG. 4). The system can maintain two lists of CHT structures: one list holds CHT structures that are currently assigned to track a particular client identifier, and another list holds unused (free) CHT structures. The in-use list is maintained in a least recently used (LRU) fashion to assist with timely and relevant recycling of CHT blocks if it should become necessary because of storage limitations. This optimization would be useful should the system need to track a very large number of clients simultaneously when some portion of the clients are inactive, disconnected, or otherwise absent for extended periods.

In one embodiment of the present invention, a lookup table (for example a hash table) is maintained to enable the rapid location of a particular client's corresponding CHT structure when given the client's identity information (source IP address for example).

The CHT structure depicted in FIG. 5 corresponds to the configuration section 32 of FIG. 4. This approach uses a contiguous block of memory for the rows and cells of each CHT structure. The CHT structures themselves are allocated at the time the suspicion accumulator is initialized and placed in the free list for subsequent use when needed. It should be noted that these memory allocation techniques and structure definitions are chosen for illustrative purposes, and that a practitioner skilled in the art could reasonably be expected to use any of several similar or related data structures and similar or related memory management techniques.

Figure 6:
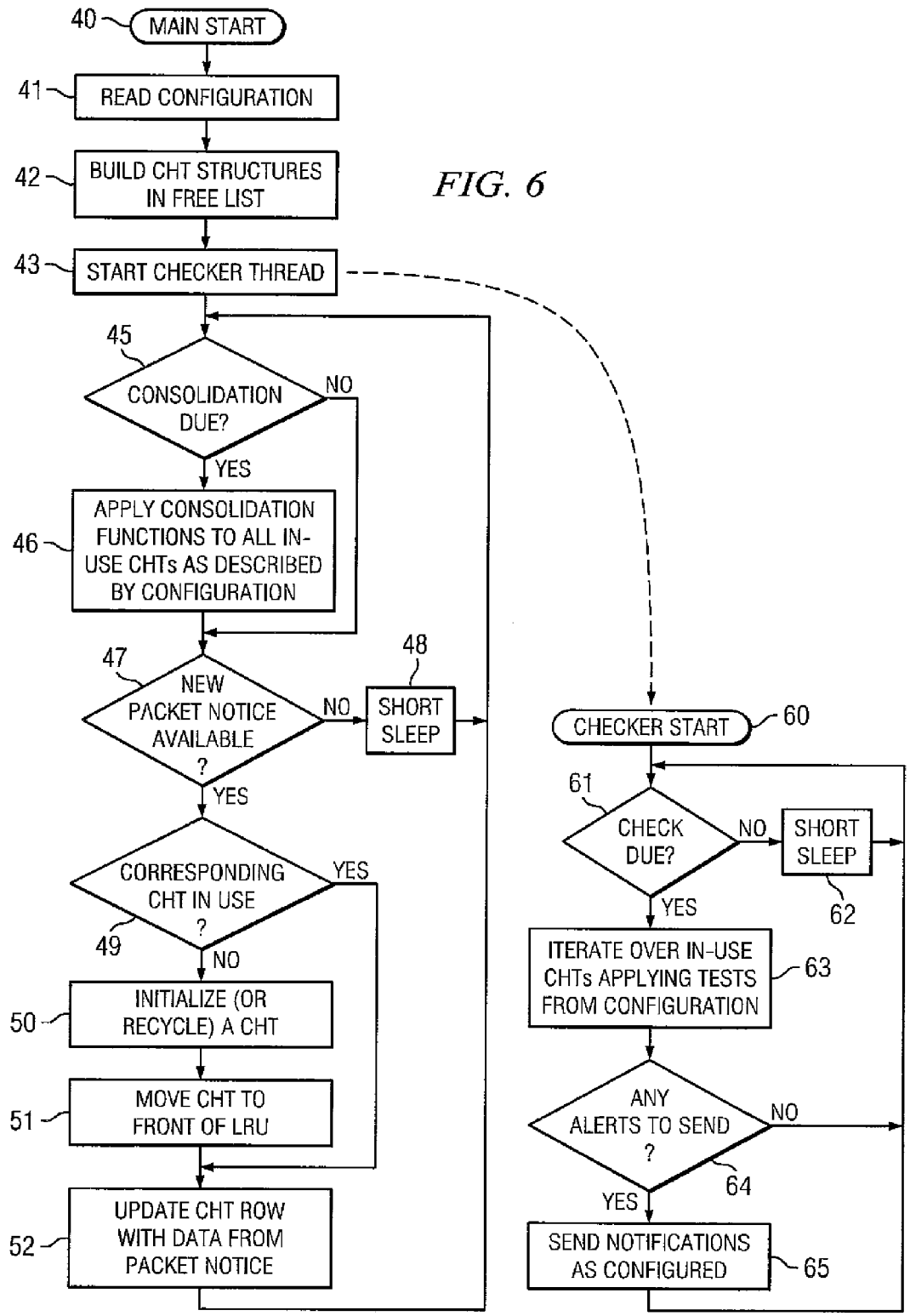
FIG. 6 is a flow chart illustrating one embodiment of a method for detecting aberrant network behavior

FIG. 6 is a flow chart illustrating one embodiment of a method for detecting aberrant network behavior according to the present invention. At step 40, the suspicion accumulator 21 begins execution and reads configuration information, and then initializes its CHT memory structures and supporting lookup table(s). At step 43, a separate thread of control is spawned to perform testing of CHT data.

Continuing with the main thread of control in the example embodiment, at step 45 the system determines whether enough time has elapsed since the last consolidation processing occurred. If so, consolidation processing 46 is conducted or repeated. The consolidation operation applies configured changes to the in-use CHT structures. Examples of consolidation operations are a time series decay algorithm, other aggregation algorithm or mathematical function, or re-initialization of a cell or cells. These consolidation instructions are expressed or defined within the configuration section 32. It should be noted that a practitioner skilled in the art could reasonably be expected to use any of several means of expressing, defining, or representing consolidation algorithm instructions within the configuration or the operating instructions.

At step 47, the main thread of control in the example embodiment checks whether any new packet notices 31 have become available at the input of the suspicion accumulator 21. If so, in steps 49-51 a CHT structure corresponding to the client is located. At step 52, the rule tag is read from the packet notice and compared to the mappings in configuration section 33. For each match, the corresponding CHT row data is updated according to the scaling factor and the instructions expressed in configuration section 32.

At step 60, a new thread of control is executing in the example embodiment. This thread is created for the periodic testing of CHT data. Whenever a check is due at step 61, the system applies the tests configured in section 34 to eligible in-use CHT structures. Whenever the test conditions are satisfied and indicate the detection of aberrant network behavior by a client, alerts are sent to internal or external entities in step 65.

It should be noted that the polling nature and iterative operational nature expressed in the example embodiment and depicted in the flowchart of FIG. 6 are presented primarily for illustrative purposes. A practitioner skilled in the art would reasonably be expected to be able to implement other, and even more efficient, means of accomplishing equivalent functionality.

Although shown as an internal portion of a network access gateway 11 in FIG. 2, suspicion accumulator 21 may be separated from the gateway and used externally. A suspicion accumulator may also be shared across multiple gateways or used in conjunction with network probe devices possessing comparable network processing subsystems.

Additionally, suspicion accumulator 21 can be executed by multiple processors. One example of an exemplary suspicion accumulator is the Rocksteady NSA Server, from Rocksteady Networks, Inc. of Austin, Tex.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

What is claimed is:

1. A system for detecting aberrant network, comprising:
a processor;
a first network interface coupled to the processor, wherein the first network interface is coupled to one or more clients;
a memory accessible by the processor;
wherein the system is configured to:
receive network communications at the first network interface, wherein each of the network communications is associated with a first client;
determine if aberrant network behavior is occurring with respect to the first client wherein determining if the network behavior is aberrant comprises:
analyzing the received network communications based upon one or more rules to determine if the network communication matches any of the one or more rules, wherein the one or more rules are configured to identify particular network communications,
if a network communication associated with the first client matches a first rule: updating a first list of statistical information associated with the first client and the first rule wherein the statistical information is accumulated over a time period, the first list is one of a first set of lists corresponding to the first client and each list comprises statistical information associated with at least one of the one or more rules; and
testing the statistical information in each list of the first set of lists using a set of conditions corresponding to aberrant network behavior, wherein each of the set of conditions is associated with at least one list of the first set of lists.

2. The system of claim 1, wherein the computer instructions are further operable to monitor a network connected to a second network interface for a second network communication.

3. The system of claim 1, wherein at least one of the one or more rules is a user-specific rule.

4. The system of claim 1, dynamically adjusting the one or more rules.

5. The system of claim 1, dynamically adjusting a threshold associated with the one or more rules.

6. The system of claim 1, wherein the one or more rules comprise input rules and output rules.

7. The system of claim 4, wherein the one or more rules are associated with a header of a packet.

8. The system of claim 3, further comprising associating the first client with a first identifier.

9. The system of claim 8, associating the set of lists associated with the client with the identifier.

10. A method for detecting aberrant network in a first network interface coupled to one or more clients, comprising:
receiving network communications at the first network interface, wherein each of the network communications is associated with a first client;
determining if an aberrant network behavior is occurring with respect to the first client wherein determining if the network behavior is aberrant comprises:
analyzing the received network communications based upon one or more rules to determine if the network communication matches any of the one or more rules, wherein the one or more rules are configured to identify particular network communications,
if a network communication associated with the first client matches a first rule: updating a first list of statistical information associated with the first client and the first rule wherein the statistical information is accumulated over a time period, the first list is one of a first set of lists corresponding to the first client and each list comprises statistical information associated with at least one of the one or more rules; and
testing the statistical information in each list of the first set of lists using a set of conditions corresponding to aberrant network behavior, wherein each of the set of conditions is associated with at least one list of the first set of lists.

11. The method of claim 10, wherein the computer instructions are further operable to monitor a network connected to a second network interface for a second network communication.

12. The method of claim 10, wherein at least one of the one or more rules is a user-specific rule.

13. The method of claim 10, dynamically adjusting the one or more rules.

14. The method of claim 10, dynamically adjusting a threshold associated with the one or more rules.

15. The method of claim 10, wherein the one or more rules comprise input rules and output rules.

16. The method of claim 4, wherein the one or more rules are associated with a header of a packet.

17. The method of claim 3, further comprising associating the first client with a first identifier.

18. The method of claim 4, associating the set of lists associated with the client with the identifier.

19. A method for detecting aberrant network, comprising providing a network interface card, the network interface card comprising a first network interface coupled to one or more clients and the first network interface is operable to receive network communications, wherein each of the network communications is associated with a first client and the network interface card is operable to determine if an aberrant network behavior is occurring with respect to the first client, wherein determining if the network behavior is aberrant utilizes:

a network processing subsystem configured to:
analyze the received network communications based upon one or more rules to determine if the network communication matches any of the one or more rules, wherein the one or more rules are configured to identify particular network communications,
if a network communication from a first client matches a first rule, forming a notification corresponding to the first rule and first client and providing the notification to a suspicion accumulator; and the suspicion accumulator is configured to:

maintain a set of lists, the set of lists corresponding to the first client and list of comprising statistical information associated with at least one of the one or more rules, the statistical information for each list accumulated over a time period;

receive the notification from the network processing subsystems;

determine that the notification is associated with the first rule and the first client;

update a first list of the set of lists associated with the first client and the first rule based on the notification; and test the statistical information in each list of the set of lists using a set of conditions corresponding to aberrant network behavior, wherein each of the set of conditions is associated with at least one list of the sets of lists.

* * * * *